(12) United States Patent
Aoki (10) Patent No.: US 10,870,262 B2
(45) Date of Patent: Dec. 22, 2020

(54) LAMINATED GLASS

(71) Applicant: AGC Inc., Chiyoda-ku (JP)

(72) Inventor: Tokihiko Aoki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 97 days.

(21) Appl. No.: 16/000,022

(22) Filed: Jun. 5, 2018

(65) Prior Publication Data

US 2018/0281352 A1 Oct. 4, 2018

Related U.S. Application Data

(63) Continuation of application No. PCT/JP2016/086511, filed on Dec. 8, 2016.

(30) Foreign Application Priority Data

Dec. 9, 2015 (JP) .................................. 2015-239985

(51) Int. Cl.
*B32B 3/10* (2006.01)
*B32B 17/10* (2006.01)
*B32B 7/12* (2006.01)

(52) U.S. Cl.
CPC .......... *B32B 17/10036* (2013.01); *B32B 7/12* (2013.01); *B32B 17/10302* (2013.01);
(Continued)

(58) Field of Classification Search
None
See application file for complete search history.

(56) References Cited

U.S. PATENT DOCUMENTS

2003/0215610 A1* 11/2003 DiGiampaolo ... B32B 17/10036
428/156
2009/0176101 A1 7/2009 Greenall et al.
(Continued)

FOREIGN PATENT DOCUMENTS

CN 101454154 A 6/2009
CN 102067032 A 5/2011
(Continued)

OTHER PUBLICATIONS

Machine translation of JP-2007106659 (Year: 2007).*
(Continued)

*Primary Examiner* — Christopher M Polley
(74) *Attorney, Agent, or Firm* — Oblon, McClelland, Maier & Neustadt, L.L.P.

(57) ABSTRACT

There is provided a laminated glass with a functional film having good design property for a long term by suppressing a peeling at an interface between a functional film and an intermediate bonding layer. A laminated glass includes: a pair of glass plates facing each other; a pair of intermediate bonding layers brought into contact with facing surfaces of the pair of glass plates; and a functional film arranged between the pair of intermediate bonding layers, wherein a thickness measured at an end portion of the laminated glass is smaller by 5 μm or more than a thickness of the laminated glass measured at a position on the inside by 10 mm from the end portion, and at least one of intermediate bonding layers has moisture permeability (A) being a degree of moisture permeability at 40° C. and 90% RH measured by JIS Z 0208: 1976 of 50 g/m²·day or less.

8 Claims, 2 Drawing Sheets

(52) U.S. Cl.
CPC .. *B32B 17/10348* (2013.01); *B32B 17/10431* (2013.01); *B32B 17/10779* (2013.01); *B32B 17/10788* (2013.01); *B32B 2307/412* (2013.01); *B32B 2307/726* (2013.01); *B32B 2307/7246* (2013.01); *B32B 2307/748* (2013.01); *B32B 2605/006* (2013.01)

(56) References Cited

U.S. PATENT DOCUMENTS

| | | | |
|---|---|---|---|
| 2011/0171443 | A1 | 7/2011 | Thompson |
| 2012/0176656 | A1* | 7/2012 | Boote .................... B32B 17/10 359/240 |
| 2016/0082812 | A1 | 3/2016 | Okuda |
| 2016/0312523 | A1 | 10/2016 | Miyasaka et al. |

FOREIGN PATENT DOCUMENTS

| | | | |
|---|---|---|---|
| CN | 102458837 | A | 5/2012 |
| CN | 102630200 | A | 8/2012 |
| CN | 102725143 | A | 10/2012 |
| CN | 105164583 | A | 12/2015 |
| CN | 106064508 | A | 11/2016 |
| EP | 2 988 168 | A1 | 2/2016 |
| EP | 3 085 530 | A1 | 10/2016 |
| JP | 5-286742 | | 11/1993 |
| JP | 2005-17860 | | 1/2005 |
| JP | 2007-106659 | | 4/2007 |
| JP | 2007106659 | A * | 4/2007 ............. B32B 17/10 |
| JP | 2009-534283 | | 9/2009 |
| JP | 2009-256129 | | 11/2009 |
| JP | 2011-524546 | | 9/2011 |
| JP | 2013-505188 | | 2/2013 |
| JP | 5625781 | | 11/2014 |
| JP | 2015-821 | | 1/2015 |
| JP | 2015-24930 | | 2/2015 |
| JP | 2015024930 | A * | 2/2015 |
| JP | 5716678 | | 5/2015 |
| JP | 2016-204222 | | 12/2016 |
| KR | 10-2008-0112389 | | 12/2008 |
| KR | 10-2012-0123375 | | 11/2012 |
| TW | 201132503 | A1 | 10/2011 |
| WO | WO 2007/122428 | A1 | 11/2007 |
| WO | WO 2009/153593 | A1 | 12/2009 |
| WO | WO 2011/033313 | A1 | 3/2011 |
| WO | WO 2011/090004 | A1 | 7/2011 |
| WO | WO 2014/171470 | A1 | 10/2014 |

OTHER PUBLICATIONS

Machine translation of JP-2015024930 (Year: 2015).*
International Search Report dated Mar. 14, 2017 in PCT/JP2016/086511, filed on Dec. 8, 2016 (with English Translation).
Written Opinion dated Mar. 14, 2017 in PCT/JP2016/086511, filed on Dec. 8, 2016.

* cited by examiner

LAMINATED GLASS

CROSS-REFERENCE TO RELATED APPLICATIONS

This application is a continuation of prior International Application No. PCT/JP2016/086511, filed on Dec. 8, 2016 which is based upon and claims the benefit of priority from Japanese Patent Application No. 2015-239985, filed on Dec. 9, 2015; the entire contents of all of which are incorporated herein by reference.

FIELD

The present invention relate to a laminated glass, and relate to a laminated glass with a functional film.

BACKGROUND

As window glass, a functional film is sealed inside a laminated glass to provide various functions to the laminated glass. For example, a laminated glass having an infrared reflection film or a light-control film sealed therein, and the like are known.

However, even if the light-control film is sealed in the laminated glass, various problems occur due to heat and moisture intruding from an end face of the laminated glass.

For example, as means for preventing deterioration, due to moisture, of an end portion of the light-control film sealed in the laminated glass, Patent Reference 1 (JP-A No. 2013-505188) describes a technique of drying a constituent material of an intermediate bonding layer to reduce the moisture content before production of a laminated glass.

SUMMARY

On the other hand, it has been hard to say that the laminated glass has sufficient durability when it is used in an outdoor environment all year long like an automobile even if using the conventional techniques, and no effective means have existed regarding a problem of a peeling phenomenon which occurs in a laminated glass, particularly peeling which occurs at an interface between a functional film and an intermediate bonding layer.

Accordingly, the present inventors conducted earnest studies. Specifically, in a laminated glass in which a functional film is sandwiched by glass plates via intermediate bonding layers, a peripheral edge portion of the laminated glass has a shape with a thickness smaller than a thickness of the other regions due to an influence of a pressure bonding step, and accordingly, a force has been applied in a peel direction due to a reaction force of the glass plates. The present inventors found out that if, in such a situation, moisture permeability of the intermediate bonding layer in the laminated glass has a predetermined numeric value, it is possible to significantly suppress peeling that occurs at an interface between the functional film and the intermediate bonding layer.

The present invention has an object to provide a laminated glass with a functional film having good design property for a long term by suppressing a peeling phenomenon, particularly peeling which occurs at an interface between a functional film and an intermediate bonding layer.

A laminated glass of the present invention includes: a pair of glass plates facing each other; a pair of intermediate bonding layers brought into contact with facing surfaces of the pair of glass plates, respectively; and a functional film arranged between the pair of intermediate bonding layers, wherein a thickness measured at an end portion of the laminated glass is smaller by 5 μm or more than a thickness of the laminated glass measured at a position on the inside by 10 mm from the end portion, and at least one of the pair of intermediate bonding layers has the following moisture permeability (A). The moisture permeability (A) indicates that a degree of moisture permeability at a temperature of 40° C. and a humidity of 90% RH measured according to JIS Z 0208: 1976 is 50 g/m$^2$·day or less.

According to the present invention, in a laminated glass with a functional film, by suppressing a peeling phenomenon, particularly peeling which occurs at an interface between a functional film and an intermediate bonding layer, it is possible to provide a laminated glass having good design property for a long term.

DETAILED DESCRIPTION

Hereinafter, embodiments of the present invention will be described. Note that the present invention is not limited to these embodiments, and these embodiments can be changed or modified without departing from the spirit and scope of the present invention.

A laminated glass of the present invention includes: a pair of glass plates facing each other; a pair of intermediate bonding layers which are brought into contact with facing surfaces of the pair of glass plates, respectively, in which at least one of them has the following moisture permeability (A); and a functional film arranged between the pair of intermediate bonding layers, in which a thickness measured at an end portion of the laminated glass is smaller by 5 μm or more than a thickness of the laminated glass measured at a position on the inside by 10 mm from the end portion. Here the moisture permeability (A) indicates that a degree of moisture permeability at a temperature of 40° C. and a humidity of 90% RH measured according to JIS Z 0208: 1976 is 50 g/m$^2$·day or less.

In the present specification, an end portion means an edge line formed when a face and a face are joined, and a peripheral edge portion means a region having a certain width from an end portion of a face toward a center portion of the face. In a laminated glass, an end portion means an outer periphery of a main surface of the laminated glass. A thickness of the laminated glass measured at an end portion corresponds to a distance from an end portion of one main surface to an end portion of the other main surface of the laminated glass at a measurement position. A thickness of the laminated glass measured at an end portion is also referred to as a thickness of the end portion of the laminated glass. In the present specification, an outer periphery side when viewed from the center portion of the main surface of the glass plate is referred to as an outside, and a center portion side when viewed from the outer periphery is referred to as an inside.

Figure 1:
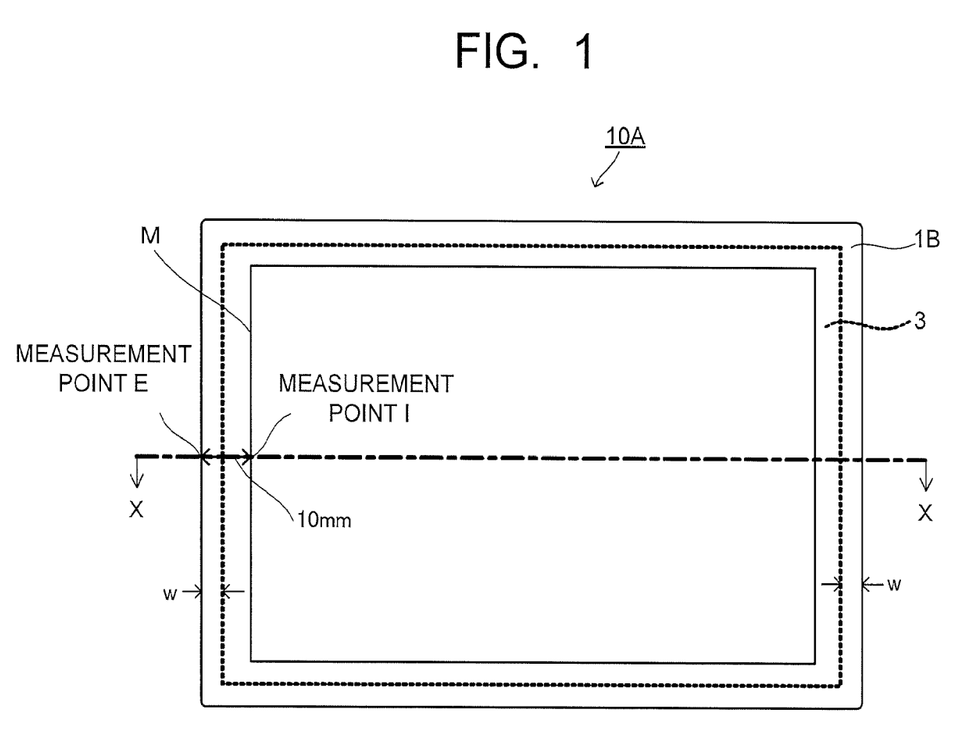
FIG. 1 is a front view of one example of an embodiment of a laminated glass of the present invention.

Hereinafter, embodiments of a laminated glass of the present invention will be described while referring to the drawings. FIG. 1 is a front view of one example of an embodiment of a laminated glass of the present invention, and FIG. 2 is a sectional view taken along a line X-X of the laminated glass illustrated in FIG. 1.

Figure 2:
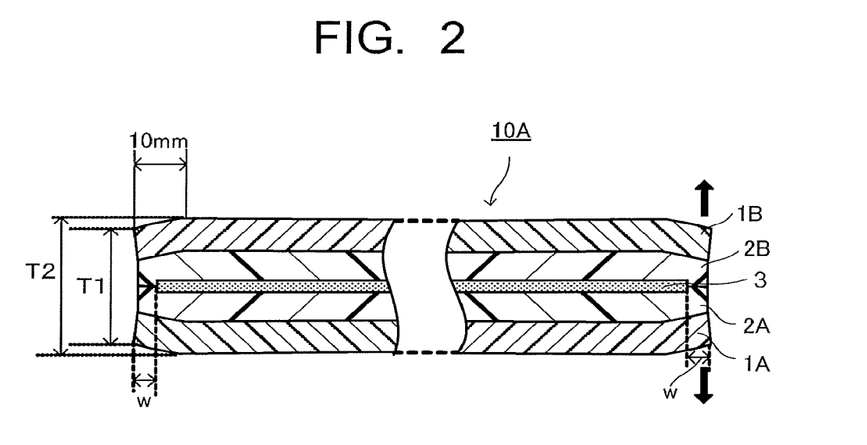
FIG. 2 is a sectional view taken along a line X-X of the laminated glass illustrated in FIG. 1.

A laminated glass 10A illustrated in FIG. 1 and FIG. 2 includes a pair of glass plates 1A and 1B facing each other, and a pair of intermediate bonding layers 2A and 2B which are brought into contact with facing surfaces of the pair of glass plates 1A and 1B, respectively. In the laminated glass 10A, the pair of glass plates 1A and 1B and the pair of intermediate bonding layers 2A and 2B have main surfaces with substantially the same shape and same dimensions.

The laminated glass 10A further includes a functional film 3 having a main surface whose area is smaller than areas of the main surfaces of the glass plates 1A and 1B and having an outer periphery of the main surface located on the inside of the outer peripheries of the main surfaces of the glass plates 1A and 1B, at a position between the pair of intermediate bonding layers 2A and 2B.

As illustrated in FIG. 1 and FIG. 2, in the laminated glass 10A, a thickness T1 measured at an end portion indicated by a measurement point E in FIG. 1 of the laminated glass 10A is smaller by 5 µm or more than a thickness T2 of the laminated glass 10A measured at a position indicated by a measurement point I in FIG. 1 on the inside by 10 mm from the end portion indicated by the measurement point E. The measurement of the thicknesses T and T2 is conducted by using an ordinary method, for example, a vernier caliper or a micrometer. As the micrometer, there can be cited a Digimatic straight line micrometer outside micrometer 406-250 OMV25M manufactured by Mitutoyo Corporation.

The phenomenon in which the thickness becomes small at the end portion of the laminated glass is a phenomenon which is caused because, in a manufacturing step of the laminated glass 10A, deaeration is performed from a periphery of a laminate formed of glass plates 1A and 1B, intermediate bonding layers 2A and 2B, and a functional film 3, and then the laminate is subjected to a step of thermopressure bonding, so that a larger compressive force is applied to an end portion of the laminate, as will be described later. For this reason, in the obtained laminated glass 10A, a force acts in directions in which the end portion expands to have a thickness same as a thickness on the inside (directions indicated by arrow marks in FIG. 2), due to a restoring force of the glass plates 1A and 1B. Note that in FIG. 2, the characteristic is illustrated with exaggeration when compared to an actual product, for the sake of explanation.

The thickness of the laminated glass obtained through the manufacturing step as described above is almost uniformly small over the entire outer periphery of the laminated glass, at the end portion when compared to the inside. Therefore, in the laminated glass of the present invention, the measurement of the thickness is only required to be performed at two points including at least an arbitrary one point of the end portion, for example, the measurement point E in the laminated glass 10A and a position on the inside by 10 mm from the end portion, for example, the measurement point I in the laminated glass 10A, as exemplified in the laminated glass 10A. The arbitrary one point of the end portion may also be any one point on the outer periphery of the laminated glass.

Note that the position on the inside by 10 mm from the measurement point of the thickness of the end portion is, when the measurement point is located on one side in a linear shape of the outer periphery of the laminated glass, a position on the inside by 10 mm from the measurement point on a line which vertically intersects with the side at the measurement point. When the outer periphery has a curved shape, the above position is a position on the inside by 10 mm from the measurement point on a vertical line of a tangent of the measurement point. In FIG. 1, a position on the inside by 10 mm from the outer periphery of the laminated glass 10A is indicated by a frame line M. In the laminated glass 10A, when an arbitrary one point on the outer periphery is set to the measurement point E of the thickness of the end portion, one point on the frame line M satisfying the above relationship with respect to the measurement point E becomes the measurement point I positioned on the inside by 10 mm from the end portion.

The effect of the present invention becomes further effective when the thickness measured at the end portion of the laminated glass is smaller by 10 µm or more, further 20 µm or more, and particularly 30 µm or more than the thickness of the laminated glass measured at the position on the inside by 10 mm from the end portion.

In the present specification, "substantially the same shape and same dimensions" means having the same shape and the same dimensions as viewed by people and, for example, when two have "substantially the same shape and same dimensions", this also includes a case where one has an outer periphery shape not having unevenness such as a cutout and the other has an outer periphery shape having a minute cutout or the like on a part thereof, in the category thereof. Also in other cases, "substantially" indicates the same meaning as above. Hereinafter, respective components which compose the laminated glass 10A will be described.

(Glass Plate)

As a material of the glass plates 1A and 1B used for the laminated glass 10A in the embodiment of the present invention, there can be cited transparent inorganic glass and organic glass (resin). As the inorganic glass, ordinary soda lime glass (which is also referred to as soda lime silicate glass), borosilicate glass, non-alkali glass, quartz glass, and the like are used without any particular limitation. Among the above, the soda lime glass is particularly preferable. A forming method thereof is also not particularly limited and, for example, float plate glass formed by a float method or the like is preferable.

As the organic glass (resin), there can be cited a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin, and the like. Among the above, the polycarbonate resin such as an aromatic polycarbonate resin and the acrylic resin such as a polymethyl methacrylate-based acrylic resin are preferable, and the polycarbonate resin is more preferable. Further, among polycarbonate resins, a bisphenol A-based polycarbonate resin is particularly preferable. Note that the glass plate may be composed by containing two or more kinds of the above resins.

As the above glass, a colorless and transparent material with no coloring component added thereto may be used, or a colored and transparent material colored within the range not impairing the effect of the present invention may be used. Moreover, one kind of the glass may be used or two or more kinds of the glass may be used in combination, and for example, a laminated substrate may be made by laminating two or more layers. Although depending on the application place of the laminated glass, the inorganic glass is preferable as the glass.

The pair of glass plates 1A and 1B used for the laminated glass 10A may be made of mutually different kinds of materials, and they are preferably made of the same kind of material. A thickness of the each glass plate 1A and 1B can be appropriately selected according to the application place of the laminated glass 10A, and generally, the thickness is preferably 0.2 to 5 mm. In particular, when the thickness of the each glass plate 1A and 1B is 0.5 to 3 mm, a residual restoring force in the laminated glass acts significantly, so that the effect of the present invention can be obtained significantly in particular.

Further, the glass plates 1A and/or 1B may have a coating that imparts a water repellent function, a hydrophilic function, an antifogging function, low emissivity, ultraviolet absorption, and the like to an exposed surface exposed to the atmosphere. Further, the facing surfaces facing each other of the glass plates 1A and/or 1B may have functional coatings such as an infrared cut coating, and a conductive coating.

Note that when the facing surfaces of the glass plates 1A and 1B have the above-described functional coatings, the following intermediate bonding layers 2A and 2B are configured to be brought into contact with the functional coatings on the facing surfaces of the glass plates 1A and 1B.

Further, there is a case where a black ceramic layer is provided mainly on peripheral edge portion of the glass plate 1A or 1B. The black ceramic layer can be formed by using a publicly-known material such as a colored ceramic paste. As ink to be used for forming the black ceramic layer, for example, there is used ink made by dispersing a deep-colored pigment, a glass frit, a refractory filler, and a resin such as ethyl cellulose in a solvent. Normally, when the ink is printed in a predetermined pattern on a glass plate, temporarily baking is performed through drying, ultraviolet irradiation or the like, and then burning is performed at a high temperature, a black ceramic layer which is perfectly baked on the glass plate can be obtained.

[Intermediate Bonding Layer]

The pair of intermediate bonding layers 2A and 2B in the laminated glass 10A have main surfaces with substantially the same shape and same dimensions as those of the main surfaces of the glass plates 1A and 1B. The intermediate bonding layers 2A and 2B are provided to be brought into contact with the facing surfaces of the glass plates 1A and 1B, respectively, while sandwiching the functional film 3 therebetween. As described above, the intermediate bonding layers 2A and 2B have a function of bonding the functional film 3 so as to sandwich it between the pair of glass plates 1A and 1B via the intermediate bonding layers 2A and 2B to integrate them as the laminated glass 10A.

At least one of the intermediate bonding layers 2A and 2B has the moisture permeability (A). The moisture permeability (A) indicates that the degree of moisture permeability at a temperature of 40° C. and a humidity of 90% RH measured according to JIS Z0208: 1976 is 50 g/m²·day or less. The moisture permeability of the intermediate bonding layer is, as the degree of moisture permeability measured similarly to the moisture permeability (A), preferably 30 g/m²·day or less, more preferably 15 g/m²·day or less, and still more preferably 10 g/m²·day or less. It is more preferable that both of the intermediate bonding layers 2A and 2B have the moisture permeability (A).

Further, at least one of the intermediate bonding layers 2A and 2B preferably has the adhesiveness (B). The adhesiveness (B) indicates that an adhesive force with respect to a polyester film is 30 N/25 mm or more, which is measured according to JIS K 6854-2: 1999, under conditions where a width of a test piece is 25 mm, a testing rate is 300 mm per minute, and a peel angle is 180 degrees. The adhesiveness of the intermediate bonding layer is, as the adhesive force measured similarly to the adhesiveness (B), more preferably 60 N/25 mm or more, and still more preferably 80 N/25 mm or more. The adhesiveness is preferably 150 N/25 mm or less, as the adhesive force measured similarly to the adhesiveness (B).

The functional film 3 sandwiched by the intermediate bonding layers 2A and 2B sometimes has a polyester film on one surface or both surfaces, like a functional film made by performing functional coating on one main surface of the polyester film or a functional film made by sandwiching a functional membrane between a pair of the polyester films, for example. As the polyester film, there can be cited, for example, polyethylene terephthalate, polybutylene terephthalate, polyethylene naphthalate, polybutylene naphthalate, or the like. When at least one of the intermediate bonding layers 2A and 2B which is brought into contact with the polyester film of the functional film 3 as above has the above-described adhesiveness (B), the adhesive force acts between the intermediate bonding layers 2A and 2B, and the functional film 3 so as to be against the restoring force of the glass plates 1A and 1B acting at the end portion of the laminated glass described above, which enables to suppress the peeling of the end portion of the laminated glass.

The intermediate bonding layer preferably further has an adhesiveness with other members of the laminated glass, for example, adhesiveness (C) indicating that an adhesive force with respect to a glass plate is not less than 40 N/25 mm nor more than 150 N/25 mm which is measured according to JIS K 6854-2: 1999, under conditions where a test piece width is 25 mm, a testing rate is 300 mm per minute, and a peel angle is 180 degrees, or adhesiveness (D) indicating that an adhesive force with respect to a black ceramic layer of a glass plate with the black ceramic layer is not less than 20 N/25 mm nor more than 150 N/25 mm which is measured according to JIS K 6854-2: 1999, under conditions where a test piece width is 25 mm, a testing rate is 300 mm per minute, and a peel angle is 180 degrees.

As the intermediate bonding layers 2A and 2B, there can be concretely cited ones made by forming compositions containing the following thermoplastic resins as a main component into sheets having main surfaces with substantially the same shape and same dimensions as those of the main surfaces of the glass plates 1A and 1B.

The thermoplastic resin is not particularly limited as long as it can be integrated when a composition containing it as a main component is formed into sheets and used as the pair of intermediate bonding layers 2A and 2B to sandwich the functional film 3, then inserted in between the pair of glass plates 1A and 1B, and heated and pressurized to form the laminated glass 10A. Although the required optical performance differs depending on the characteristic of the functional film to be sealed in the laminated glass, a transmittance of the intermediate bonding layer is preferably one capable of achieving 80% or more of visible light transmittance in a state where a laminated glass is formed by combining the intermediate bonding layers with normal colorless and transparent glass.

Concrete examples of the thermoplastic resin include thermoplastic resins which are conventionally used as intermediate bonding layers, such as a polyvinyl acetal resin such as a polyvinyl butyral resin (PVB), a polyvinyl chloride resin, a saturated polyester resin, a polyurethane resin, an ethylene-vinyl acetate copolymer resin (EVA), an ethylene-ethyl acrylate copolymer resin, and a polyolefin based copolymer. These thermoplastic resins may be used independently or two or more kinds of them may be used in combination.

The thermoplastic resin for the intermediate bonding layer of the laminated glass is selected according to usage and in consideration of balance among various properties such as transparency, weather resistance, strength, adhesive force, penetration resistance, impact energy absorbency, moisture resistance, heat insulating property, and sound insulating property. From a viewpoint of these conditions, a resin composition in which a vinyl acetate unit in an ethylene-vinyl acetate copolymer is saponified, an ethylene-vinyl acetate copolymer resin composition as described in JP-B No. 5625781, characterized in that organized layered clay, a silane coupling agent, and the like are contained in an ethylene-vinyl acetate copolymer, and so on are preferable among the above-described thermoplastic resins. Containing the organized layered clay makes it possible to significantly reduce the moisture permeability as compared to an ordinary ethylene-vinyl acetate copolymer resin composition. Further, a resin composition containing a modified block copolymer hydride described in JP-A No. 2015-821 can also be preferably used.

For the intermediate bonding layer, a material that does not affect the function of the functional film when manufactured and used is preferable. Therefore, the thermoplastic resin preferably contains no plasticizer, or when the thermoplastic resin contains the plasticizer, it is preferable that the thermoplastic resin contains the plasticizer which does not affect the functional film.

Further, although a heating temperature when forming the laminated glass is set according to the thermoplastic resin for the intermediate bonding layer, if the heating temperature is equal to or more than a heatproof temperature of the functional film, there is a case where the functional film does not sufficiently function when it is made into the laminated glass. From this point, it is preferable to select the thermoplastic resin for the intermediate bonding layer so that the laminated glass forming temperature becomes equal to or less than the heatproof temperature of the functional film to be used.

As described above, for production of the intermediate bonding layers 2A and 2B, a thermoplastic resin-containing composition containing the above-described thermoplastic resin as a main component is used. The thermoplastic resin-containing composition may contain one kind or two or more kinds of various additives such as, for example, an infrared absorbent, an ultraviolet absorbent, a fluorescer, an adhesion regulator, a coupling agent, a surfactant, an antioxidant, a heat stabilizer, a light stabilizer, a dehydrating agent, a defoaming agent, an antistatic agent, and a flame retarder within the range not impairing the effect of the present invention and according to various purposes. These additives are entirely and uniformly contained in the intermediate bonding layers 2A and 2B.

A film thickness of the intermediate bonding layers 2A and 2B is not particularly limited. Concretely, the film thickness of one layer is preferably 0.05 to 0.8 mm, and the total film thickness of two layers is preferably 0.1 mm or more, similarly to the intermediate bonding layers which are normally used for the laminated glass and the like. If the film thickness of one layer of the intermediate bonding layers is less than 0.05 mm or the total film thickness of two layers is less than 0.1 mm, strength sometimes becomes insufficient, and if there is a large glass mismatch, peeling becomes likely to occur. When the total film thickness of the intermediate bonding layers 2A and 2B becomes 0.7 mm or more and further, when it becomes 0.8 mm or more, it is possible to particularly effectively suppress swelling of the intermediate bonding layers caused by intrusion of moisture from the end portion, and thus it is possible to particularly significantly achieve the effect of the present invention.

Each of the intermediate bonding layers 2A and 2B is not limited to a single-layer structure. The intermediate bonding layers 2A and 2B may be the same and do not need to be the same, and each of them can independently select a single-layer structure or a multilayer structure.

[Functional Film]

As the functional film 3, there can be cited a light-control film, an infrared reflection film, a screen film for image projection, a thin solar cell film for power generation, a self-luminous film, and the like. The functional film may have a configuration in which coating is performed on a film such as, for example, a polyester film, or a configuration in which a material having functions of reflection of light, light scattering, power generation, light emission and the like is sandwiched between two or more of films, for example, polyester films.

As the functional film, one kind or two or more kinds thereof are used. When two or more kinds of the functional films are used, it is preferable to combine and use the functional films with different functions such as later-described light-control film and infrared reflection film, for example. When the laminated glass of the present invention includes the functional film which includes at least one kind selected from the light-control film and the infrared reflection film, it is possible to effectively suppress the deterioration of the functional film due to the intrusion of moisture and the like from the end portion, in particular.

A thickness of the functional film 3 is preferably 25 to 500 µm from a viewpoint of handleability and deaeration treatment in a laminated glass manufacturing step. At this time, if the thickness of the functional film is 25 to 120 µm, a barrier layer provided so as to surround the functional film in the laminated glass may be unnecessary as will be described later, and when the thickness of the functional film becomes 120 to 500 µm, the later-described barrier layer is preferably provided. When the thickness of the functional film 3 becomes 200 µm or more, and further, when it becomes 300 µm or more, it is possible to particularly effectively suppress the deterioration of the functional film caused by the intrusion of moisture and the like from the end portion, and thus it is possible to particularly significantly achieve the effect of the present invention.

Although the functional film will be explained by citing a light-control film as an example by using the laminated glass 10A illustrated in FIG. 1 and FIG. 2, the laminated glass of the present invention is not limited to this. A light-control film being the functional film 3 (hereinafter, the light-control film is also denoted by a reference numeral 3) has a main surface having an area smaller than and substantially the similar shape as those of the main surfaces of the glass plates 1A and 1B, and is arranged between the intermediate bonding layers 2A and 2B so that the outer periphery of the main surface is positioned on the inside of the outer peripheries of the main surfaces of the glass plates 1A and 1B.

Figure 3:
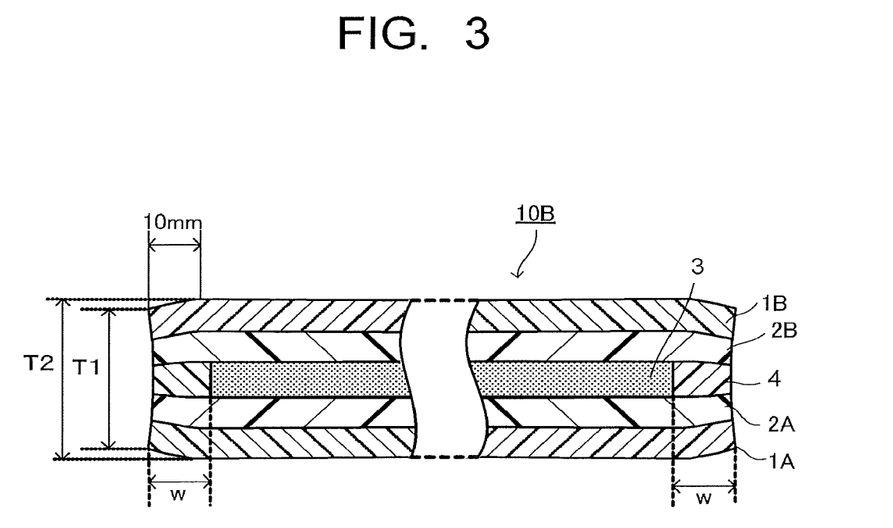
FIG. 3 is a sectional view of another example of the embodiment of the laminated glass of the present invention.

In the laminated glass 10A illustrated in FIG. 1 and FIG. 2, the main surfaces of the glass plates 1A and 1B are rectangular. The main surface shape of the light-control film 3 is a shape made by cutting all of peripheries of end portions at four sides into band shapes with respect to the main surface shapes of the glass plates 1A and 1B, in other words, into a frame shape, and the intermediate bonding layers 2A and 2B or a later-described barrier layer 4 illustrated in FIG. 3 are/is provided in a manner to compensate for the cut portion. According to need, the main surface shape of the light-control film 3 may be a shape made by cutting a part of the peripheral edge portions, for example, only a peripheral edge portion at any one side of the four sides into a band shape with respect to the main surface shapes of the glass plates 1A and 1B, a shape made by cutting peripheral edge portions at any two sides, or a shape made by cutting peripheral edge portions at any three sides. Also in such a case, the intermediate bonding layers 2A and 2B or the barrier layer 4 are/is only required to be arranged according to the cut shape of the light-control film 3 in a manner to compensate for the cut portion.

A width w of the cut portion of the light-control film 3 can be appropriately selected according to the usage. The laminated glass of the present invention is configured to be able to suppress the peeling between the intermediate bonding layer and the light-control film, so that the width w of the cut portion of the light-control film 3 may be 40 mm or less, and may be preferably 20 mm or less. When higher reliability is taken into consideration, the light-control film 3 preferably has the cut portion. Specifically, the width w of the cut portion of the light-control film 3 is preferably greater than 0 mm and equal to or less than 40 mm.

As the light-control film 3, it is possible to use a suspended particle device (SPD) film, a light-control film using a liquid crystal element, an electrochromic light-control film, or the like. As the SPD film, a general SPD film is usable that is configured to sandwich a polymer layer containing suspended particles that can be oriented by application of voltage thereto between two electrically insulating films having insides coated with transparent conducting films.

As the SPD film, a commercial product can be used. Incidentally, such a commercial product is supplied in a predetermined size, so that it is cut, when used, into a desired size according to the size of the laminated glass. Note that a thickness of the SPD film used for the laminated glass 10A is not particularly limited, and it is preferably 200 to 400 µm from the viewpoint of handleability and easiness of availability.

As the light-control film using the liquid crystal element, there can be cited, for example, a liquid crystal light-control element disclosed in JP-A No. 2005-17860, made by sandwiching a liquid crystalline mixture containing a non-polymerizable liquid crystal composition and a polymerizable compound between a pair of transparent resin substrates with electrodes at a temperature at which the liquid crystalline mixture has a predetermined or more of viscosity and shows a liquid crystal phase, and one made by arranging a liquid crystal composition containing a polymerizable compound which is polymerized by ultraviolet rays, between a pair of transparent resin substrates with electrodes.

Note that when the laminated glass having the light-control film sealed therein is mounted on a vehicle such as an automobile or a railway vehicle, an airplane, or the like, if a power source mounted on the inside the vehicle, the airplane, or the like is cut off, the laminated glass stops driving in its opaque state, which may cause a safety problem. In anticipation of this situation, when the laminated glass having the light-control film sealed therein as above is used, it is possible to take measures such that an emergency power source is mounted on the inside the vehicle or inside the airplane, separately from the aforementioned power source, there is provided an outlet capable of supplying a power source in an emergency from the outside the vehicle or the outside the airplane, in a system separately from the aforementioned power source, or ordinary laminated glass having no light-control function is partially arranged.

[Barrier Layer]

FIG. 3 illustrates a sectional view of one example of the laminated glass of the present invention provided with a barrier layer. A laminated glass 10B illustrated in FIG. 3 includes a pair of glass plates 1A and 1B facing each other, a pair of intermediate bonding layers 2A and 2B which are brought into contact with facing surfaces of the pair of glass plates 1A and 1B, respectively, and a functional film, for example, a light-control film 3 arranged so as to be sandwiched by the intermediate bonding layers 2A and 2B. In the laminated glass 10B, the pair of glass plates 1A and 1B and the pair of intermediate bonding layers 2A and 2B have main surfaces with substantially the same shape and same dimensions, a main surface of the light-control film 3 has a size such that an outer periphery of the main surface is entirely positioned on the inside by a width w relative to the outer peripheries of the glass plates 1A and 1B, and a barrier layer 4 whose main surface has a frame shape with the width w is provided on the outside of the light-control film 3 in a manner that it is brought into contact with an end face of the light-control film 3 and it is sandwiched by the intermediate bonding layers 2A and 2B.

In the laminated glass 10B, the configuration other than the barrier layer 4 is similar to the configuration of the laminated glass 10A. The barrier layer 4 is, for example, previously formed in the frame shape so as to surround the periphery of the light-control film 3 to be laminated at the time of manufacturing the laminated glass 10B, and it preferably has the moisture permeability (A). Note that the moisture permeability (A) is as described above. The moisture permeability of the barrier layer 4 is, as the moisture permeability measured similarly to the moisture permeability (A), more preferably 30 g/m²·day or less, furthermore preferably 15 g/m²·day or less, and still more preferably 10 g/m²·day or less. As a material of forming the barrier layer 4, a material similar to the material of the aforementioned intermediate bonding layer can be used.

In the laminated glasses 10A and 10B each having the light-control film 3 as the functional film, it is possible that another functional film other than the light-control film 3, normally, a functional film whose function is different from that of the light-control film 3, is provided between the pair of glass plates 1A and 1B. When the another functional film is provided, for example, an intermediate bonding layer is further provided in addition to the above-described pair of intermediate bonding layers 2A and 2B, and the laminated glass may be configured by laminating the glass plate, the intermediate bonding layer, the another functional film, the intermediate bonding layer, the light-control film, the intermediate bonding layer, and the glass plate in this order. This laminated constitution can be applied in common in cases where two types of functional films are used. Further, also in a case where two types of functional films are used, it is also possible that the functional films are designed to have main surfaces whose outer peripheries are located on the inside of the outer peripheries of the glass plates, and the barrier layers are provided so as to surround the peripheries of the functional films.

As the another functional film in the laminated glasses 10A and 10B each having the light-control film 3 as the functional film, there can be cited an infrared reflection film and so on, for example. As the infrared reflection film, concretely, there can be cited one in which a conventionally well-known infrared reflection film such as an infrared reflection film having a film thickness of about 100 to 500 nm and including a dielectric multilayer film, a liquid crystal alignment film, an infrared reflector-containing coating film, and a single-layer or multilayer infrared reflective film including a metal film is formed as an infrared reflection film on a supporting film such as a PET (polyethylene terephthalate) film having a thickness of about 25 to 200 µm or the like. As the infrared reflection film, a dielectric multilayer film made by laminating resin films with different refractive indices and having a total film thickness of about 25 to 200 µm, and so on can be further cited.

Although the laminated glass of the present invention has been explained above by taking the laminated glass 10A illustrated in FIGS. 1 and 2 and the laminated glass 10B illustrated in FIG. 3 as examples, the present invention is not limited to this. The design can be changed or modified in a range without departing from the spirit and the scope of the present invention. The laminated glass according to the embodiment may have a configuration having three or more glass plates according to need in which, for example, one or more glass plates are laminated on the atmosphere side of the glass plate 1A or the glass plate 1B of the laminated glasses 10A or 10B each via an intermediate bonding layer prepared separately from the intermediate bonding layers 2A and 2B. Further, the laminated glass according to the embodiment may optionally have another layer within the range not impairing the effect of the present invention, in addition to the above-described components.

(Another Layer)

In the laminated glass according to the embodiment, a black ceramic layer is sometimes provided, as another layer, in a band shape at a part or all of the peripheral edge portion of the main surface, on a side where it is brought into contact with the intermediate bonding layer, of at least one of the glass plates out of the pair of glass plates composing the laminated glass, for the purpose of hiding a portion attached to a frame body or the like, the wiring conductor, and so on and for the purpose of preventing appearance deterioration as a result of deterioration over time of the end portion of the functional film such as the light-control film due to moisture from the outside. Also in the laminated glass according to the embodiment, such a black ceramic layer may be provided as another layer. However, from the viewpoint of improvement of design property, when the laminated glass of the present invention does not have the black ceramic layer, or even if it has the black ceramic layer, a width of the black ceramic layer is narrow, which is concretely 30 mm or less, further 25 mm or less, and particularly 20 mm or less, the effect of the present invention can be obtained significantly in particular.

[Manufacture of Laminated Glass]

The laminated glass according to the embodiment of the present invention can be manufactured by a generally used publicly-known technique. For example, in the laminated glass 10A, a laminate in which the functional film, for example, the light-control film 3 is arranged to be located in a predetermined positional relationship between the pair of intermediate bonding layers 2A and 2B is produced, and the laminate is inserted in between the pair of glass plates 1A and 1B to prepare a laminated glass precursor being laminated glass before pressure bonding in which the glass plate 1A, the intermediate bonding layer 2A, the functional film (light-control film) 3, the intermediate bonding layer 2B, and the glass plate 1B are laminated in this order. Also in the case of having another layer, glass plates and respective layers are laminated in the similar lamination order to that of similarly obtained laminated glass to prepare a laminated glass precursor.

Further, the laminated glass may also be manufactured through the following method. Specifically, in the laminated glass 10B, a laminate in which the functional film, for example, the light-control film 3 and the barrier layer 4 are arranged to be located in a predetermined positional relationship between the pair of intermediate bonding layers 2A and 2B is produced, and the laminate is inserted in between the pair of glass plates 1A and 1B to prepare a laminated glass precursor being laminated glass before pressure bonding in which the glass plate 1A, the intermediate bonding layer 2A, the layer composed of the functional film (light-control film) 3 and the barrier layer 4, the intermediate bonding layer 2B, and the glass plate 1B are laminated in this order.

This laminated glass precursor is put in a vacuum bag such as a rubber bag, the vacuum bag is connected to an exhaust system, bonding is performed at a temperature of about 70 to 110° C. while performing pressure-reduction suction (deaeration) so that a pressure in the vacuum bag becomes a pressure reduction degree of about −65 to −100 kPa, and thereby the laminated glass according to the embodiment can be obtained. Further, for example, by making the laminated glass precursor after above bonding treatment to be subjected to pressure bonding treatment of heating and pressurizing it under conditions of 100 to 110° C. and a pressure of 0.6 to 1.3 MPa, it is possible to obtain laminated glass having further excellent durability.

The laminated glass of the present invention suppresses deterioration over time of the functional property, particularly peeling of the functional film and the intermediate bonding layer caused by swelling of the intermediate bonding layer which is caused by intrusion of moisture from the end portion, resulting in that it is possible to obtain a laminated glass with no problems in appearance for a long term. The laminated glass of the present invention is suitably used for window glass for vehicle, for example.

EXAMPLES

Hereinafter, the present invention will be explained in more detail using examples. The present invention is not limited at all to embodiments and examples to be explained below.

Example 1

(Production of Evaluation Sample)

An evaluation sample having a configuration similar to that of the laminated glass 10B illustrated in FIG. 3 was produced in the following manner. Hereinafter, explanation will be made by giving reference numerals same as those in the laminated glass 10B to respective members of the evaluation sample corresponding to the respective members of the laminated glass 10B.

Glass plates 1A and 1B (2 mm thickness, 150 mm×150 mm size) made of two pieces of soda lime glass, two saponified EVA intermediate bonding layers 2A and 2B (manufactured by TOSOH NIKKEMI CORPORATION, Melthene G7055 (product name), 0.4 mm thickness, 150 mm×150 mm size), one SPD light-control film 3 (manufactured by Hitachi Chemical Co., Ltd., LCF-1103DHA90 (product name), 0.35 mm thickness, 130 mm×130 mm size, with both surfaces composed of polyester films), a barrier layer 4 (manufactured by TOSOH NIKKEMI CORPORATION, Melthene G7055 (product name), 0.4 mm thickness, 150 mm×150 mm size in which a center portion thereof was hollowed out so that an edge had a frame shape with a width w of 10 mm), were prepared. They were laminated in the order of the one glass plate 1A, the one EVA intermediate bonding layer 2A, the SPD light-control film 3, the barrier layer 4 around the SPD light-control film, the other EVA intermediate bonding layer 2B, and the other glass plate 1B, to thereby obtain a laminate.

The laminate obtained in the above was put in a vacuum packaging made of rubber to be subjected to deaeration, then put into an oven kept at 100° C. and let stand for 60 minutes, and subjected to pressure bonding, to thereby obtain the evaluation sample. A thickness T1 of one point (measurement point E) of an end portion of this evaluation sample and a thickness T2 at a position (measurement point I) on the inside by 10 mm from the one point (measurement point E) of the end portion were respectively measured by a vernier caliper, and a thickness difference=the thickness T2 [μm] at the position (measurement point I) on the inside by 10 mm from the end portion of this sample the thickness T1 [μm] of the end portion (measurement point E) of this sample was calculated. Note that in this example, the measurement point E was set to a center portion of one side of an outer periphery of the laminated glass, and the measurement point I was set to a position on the inside by 10 mm from the measurement point E toward the center of the laminated glass. A result thereof was described in Table 1 as the thickness difference.

The moisture permeability of the aforementioned intermediate bonding layer (Melthene G7055) was measured by the above-described method similar to the method for the moisture permeability (A) according to JIS Z 0208: 1976, and a result thereof was 14 [g/m$^2$·day].

Further, the adhesive force between the aforementioned intermediate bonding layer (Melthene G7055) and the polyester film was measured by the above-described method similar to the method for the adhesiveness (B) according to JIS K 6854-2: 1999, and a result thereof was 86.0 [N/25 mm]. Note that the sample for measuring the adhesiveness with respect to the polyester film was produced in the following manner. A polyester film (manufactured by Toyobo Co., Ltd, product name COSMOSHINE A4100, 100 mm thickness×60 mm×25 mm size) and the aforementioned intermediate bonding layer were laminated in this order, and this laminate was put in a vacuum bag made of plastic. After that, it was subjected to pressure bonding at 110° C. while performing deaeration under reduced pressure so that a pressure reduction degree became −60 kPa or less.

(Moisture Resistance Evaluation)

The evaluation sample obtained in the above was put in a thermohygrostat at 80° C. and a humidity of 95% RH for 1000 hours. As the moisture resistance evaluation, a thickness of one point (measurement point E) of the above-described end portion of the evaluation sample was measured before and after the evaluation sample was put in the thermohygrostat (the thickness before the evaluation sample was put in the thermohygrostat was set to T$1_{before}$, and the thickness after the evaluation sample was put in the thermohygrostat was set to T$1_{after}$) by using a vernier caliper, and "thickness change rate (%)" was calculated through (T$1_{after}$−T$1_{before}$)/T$1_{before}$×100[%]. Further, the presence or absence of peeling of the evaluation sample was evaluated visually. Results thereof are shown in Table 1.

Example 2

An evaluation sample for experiment was produced similarly to the evaluation sample of the above-described example 1 except that the SPD light-control film 3 was changed in shape (110 mm×110 mm size) while using the same material, and the barrier layer 4 was changed in shape (a center portion thereof with a size of 150 mm×150 mm was hollowed out so that an edge had a frame shape with a width w of 20 mm) while using the same material, and the moisture-proof property evaluation similar to the above was performed. The measurement results are shown in Table 1.

Example 3

An evaluation sample for experiment was produced similarly to the evaluation sample of the above-described example 1 except that the SPD light-control film 3 was changed in shape (70 mm×70 mm size) while using the same material, and the barrier layer 4 was changed in shape (a center portion thereof with a size of 150 mm×150 mm was hollowed out so that an edge had a frame shape with a width w of 40 mm) while using the same material, and the moisture-proof property evaluation similar to the above was performed. The measurement results are shown in Table 1.

Comparative Example 1

An evaluation sample for experiment was produced similarly to the evaluation sample of the above-described example 1 except that each of the intermediate bonding layers 2A and 2B, and the barrier layer 4 was changed to another EVA intermediate bonding layer (manufactured by TOSOH NIKKEMI CORPORATION, Melthene G7060 (product name)) while having the same shape and the same size, and the moisture-proof property evaluation similar to the above was performed. The measurement results are shown in Table 1. Note that when the moisture permeability and the adhesive force of Melthene G7060 were measured similarly to the above-described example 1, the moisture permeability was 53 [g/m$^2$·day], and the adhesive force was 28.1 [N/25 mm].

Comparative Example 2

An evaluation sample for experiment was produced similarly to the evaluation sample of the above-described example 2 except that each of the intermediate bonding layers 2A and 2B, and the barrier layer 4 was changed to one using another material (manufactured by TOSOH NIKKEMI CORPORATION, Melthene G7060 (product name)) while having the same shape and the same size, and the moisture-proof property evaluation similar to the above was performed. The measurement results are shown in Table 1.

Reference Example

A laminate obtained through a procedure similar to that of the aforementioned example 2 was put in a vacuum packaging made of rubber in a state where a spacer for adjustment of pressurizing force was arranged in a periphery thereof while referring to JP-A No. H05-286742, to thereby obtain an evaluation sample. The measurement results are shown in Table 1.

TABLE 1

| | | Example 1 | Example 2 | Example 3 | Comparative example 1 | Comparative example 2 | Reference example |
|---|---|---|---|---|---|---|---|
| Material of intermediate bonding layer and barrier layer | Product name | Melthene G7055 | | | Melthene G7060 | | Melthene G7055 |
| | Degree of moisture permeability according to measuring method of moisture permeability (A) [g/m$^2$ · day] | 14 | | | 53 | | 14 |
| | Adhesive force according to measuring method of adhesiveness (B) [N/25 mm] | 86 | | | 28.1 | | 86 |
| | Frame width w of barrier layer 4 [mm] | 10 | 20 | 40 | 10 | 20 | 20 |
| Thickness difference (T2 − T1) [μm] | | 103 | 86 | 59 | 119 | 93 | 1 |
| Moisture resistance evaluation of laminated glass | Appearance after 1000 hours | Absence of peeling | Absence of peeling | Absence of peeling | Presence of peeling (total length of 250 mm, width of 3 mm) | Presence of peeling (total length of 200 mm, width of 2 mm) | Absence of peeling |
| | Thickness change rate (percentage %) | <0.1% | <0.1% | <0.1% | 0.90% | 0.90% | 0.90% |

From Table 1, it can be understood that when the intermediate bonding layer which exhibits the above-described moisture permeability (A) is used, the occurrence of peeling is significantly suppressed, and thus excellent moisture-proof property is provided.

What is claimed is:

1. A laminated glass, comprising:
   a pair of glass plates facing each other, wherein the thickness of the pair of glass plates is uniform;
   a pair of intermediate bonding layers brought into contact with facing surfaces of the pair of glass plates, respectively; and
   a functional film arranged between the pair of intermediate bonding layers, wherein
   a thickness measured at an end portion of the laminated glass is smaller by 5 μm or more than a thickness of the laminated glass measured at a position on the inside by 10 mm from the end portion, and
   at least one of the pair of intermediate bonding layers has the following moisture permeability (A),
   the moisture permeability (A) indicates that a degree of moisture permeability at a temperature of 40° C. and a humidity of 90% RH measured according to JIS Z 0208: 1976 is 50 g/m2·day or less.

2. The laminated glass according to claim 1, wherein
   the functional film has a polyester film on a surface, and
   at least one of the intermediate bonding layers brought into contact with the polyester film exhibits the following adhesiveness (B),
   the adhesiveness (B) indicates that an adhesive force with respect to a polyester film is 30 N/25 mm or more, which is measured according to JIS K 6864-2: 1999, under conditions where a width of a test piece is 25 mm, a testing rate is 300 mm per minute, and a peel angle is 180 degrees.

3. The laminated glass according to claim 1, wherein
   an end portion of the functional film is positioned on the inside by greater than 0 mm and equal to or less than 40 mm relative to end portions of the pair of glass plates.

4. The laminated glass according to claim 1, wherein
   a thickness of the functional film is 200 μm or more.

5. The laminated glass according to claim 1, wherein
   a total thickness of the intermediate bonding layers is 0.7 mm or more.

6. The laminated glass according to claim 1, further comprising
   a black ceramic layer with a width of 30 mm or less at a peripheral edge portion of a main surface, on a side where it is brought into contact with the intermediate bonding layer, of at least one of the glass plates out of the pair of glass plates.

7. The laminated glass according to claim 1, wherein
   the laminated glass comprises a plurality of the functional films with different functions, at a position between the pair of glass plates and the pair of intermediate bonding layers.

8. The laminated glass according to claim 1, wherein
   the functional film includes at least one selected from the group consisting of a light-control film and an infrared reflection film.

* * * * *